US011394731B2

(12) United States Patent
Mehrotra et al.

(10) Patent No.: US 11,394,731 B2
(45) Date of Patent: Jul. 19, 2022

(54) COMPUTER SYSTEM PROVIDING ANOMALY DETECTION WITHIN A VIRTUAL COMPUTING SESSIONS AND RELATED METHODS

(71) Applicant: Citrix Systems, Inc., Fort Lauderdale, FL (US)

(72) Inventors: Mudit Mehrotra, Bangalore (IN); Vikramjeet Singh Sandhu, Bangalore (IN); Abhinav Muralidhar Kulkarni, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 187 days.

(21) Appl. No.: 15/596,144

(22) Filed: May 16, 2017

(65) Prior Publication Data
US 2018/0337936 A1    Nov. 22, 2018

(51) Int. Cl.
*H04L 29/06* (2006.01)
*H04L 9/40* (2022.01)
(Continued)

(52) U.S. Cl.
CPC .......... *H04L 63/1425* (2013.01); *G06F 9/452* (2018.02); *G06F 9/45558* (2013.01); *G06F 21/53* (2013.01); *G06F 21/552* (2013.01); *G06F 21/577* (2013.01); *G06N 20/00* (2019.01); *H04L 67/10* (2013.01); *H04L 67/14* (2013.01); *G06F 2009/45579* (2013.01); *G06F 2009/45591* (2013.01); *G06F 2009/45595* (2013.01); *G06F 2221/034* (2013.01); *G06N 20/10* (2019.01)

(58) Field of Classification Search
None
See application file for complete search history.

(56) References Cited

U.S. PATENT DOCUMENTS 8,549,643 B1 * 10/2013 Shou ............... G06F 21/556
    455/410
8,650,303 B1 * 2/2014 Lang ............... G06F 21/51
    709/226

(Continued)

OTHER PUBLICATIONS

Wilson Lian, Fabian Monrose, and John McHugh. 2010. Traffic classification using visual motifs: an empirical evaluation. In Proceedings of the Seventh International Symposium on Visualization for Cyber Security (VizSec '10). Association for Computing Machinery, New York, NY, USA, 70-78.*

(Continued)

*Primary Examiner* — Jeffrey Nickerson
*Assistant Examiner* — Vadim Savenkov
(74) *Attorney, Agent, or Firm* — Allen, Dyer, Doppelt + Gilchrist, PA

(57) ABSTRACT

A method may include running virtual sessions on a virtualization server for a plurality of client devices associated with respective users, with the virtual sessions being responsive to traffic from the client devices. The method may further include generating baseline traffic patterns for the users based upon the traffic from respective client devices during the virtual sessions, monitoring traffic during a new virtual session for a given client device and detecting an anomaly therein relative to at least one of the baseline traffic patterns, and generating an anomaly alert based upon detecting the anomaly.

14 Claims, 5 Drawing Sheets

(51) Int. Cl.
*G06F 9/455* (2018.01)
*G06F 21/53* (2013.01)
*G06N 20/00* (2019.01)
*G06F 9/451* (2018.01)
*H04L 67/14* (2022.01)
*H04L 67/10* (2022.01)
*G06F 21/57* (2013.01)
*G06F 21/55* (2013.01)
*G06N 20/10* (2019.01)

(56) References Cited

U.S. PATENT DOCUMENTS

| | | | | |
|---|---|---|---|---|
| 8,677,472 B1* | 3/2014 | Dotan | ............... | H04L 67/22 726/12 |
| 9,537,880 B1* | 1/2017 | Jones | ............... | H04L 63/1425 |
| 9,626,677 B2* | 4/2017 | Turgeman | ............... | G06Q 20/4016 |
| 9,749,342 B1* | 8/2017 | Krage | ............... | G06F 9/46 |
| 10,078,459 B1* | 9/2018 | Natanzon | ............... | G06F 3/0619 |
| 10,489,711 B1* | 11/2019 | Inbar | ............... | H04L 43/08 |
| 2005/0097364 A1* | 5/2005 | Edeki | ............... | G06F 21/31 726/4 |
| 2011/0167494 A1* | 7/2011 | Bowen | ............... | G06F 21/566 726/24 |
| 2013/0283378 A1* | 10/2013 | Costigan | ............... | G06K 9/00355 726/23 |
| 2016/0100015 A1 | 4/2016 | Levy et al. | | |
| 2016/0100465 A1* | 4/2016 | Prescott | ............... | A63F 13/22 345/170 |
| 2016/0142430 A1* | 5/2016 | Brew | ............... | H04L 63/1425 726/23 |
| 2016/0191554 A1* | 6/2016 | Kaminsky | ............... | G06F 21/31 726/23 |
| 2017/0061322 A1* | 3/2017 | Chari | ............... | G06N 99/005 |
| 2017/0070524 A1* | 3/2017 | Bailey | ............... | H04L 63/1416 |
| 2017/0134403 A1* | 5/2017 | Hearn | ............... | H04L 63/1416 |
| 2017/0180416 A1* | 6/2017 | Giura | ............... | H04L 63/1458 |
| 2017/0223049 A1* | 8/2017 | Kuperman | ............... | H04L 63/1466 |
| 2018/0343672 A1* | 11/2018 | Hassan | ............... | H04W 48/08 |

OTHER PUBLICATIONS

HDX Monitor: Citrix Insight Services; https://cis.citrix.com/hdx/download/ retrieved from internet May 16, 2017; 1 pg.

* cited by examiner

COMPUTER SYSTEM PROVIDING ANOMALY DETECTION WITHIN A VIRTUAL COMPUTING SESSIONS AND RELATED METHODS

TECHNICAL FIELD

This application generally relates to computer networks, and more particularly to managing virtual sessions in conjunction with server-based and cloud computing environments and related methods.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

Desktop virtualization systems may be implemented using a single virtualization server or a combination of servers interconnected as a server grid. For example, a cloud computing environment, or cloud system, may include a pool of computing resources (e.g., desktop virtualization servers), storage disks, networking hardware, and other physical resources that may be used to provision virtual desktops, along with additional computing devices to provide management and customer portals for the cloud system.

Cloud systems may dynamically create and manage virtual machines for customers over a network, providing remote customers with computational resources, data storage services, networking capabilities, and computer platform and application support. For example, a customer in a cloud system may request a new virtual machine having a specified processor speed and memory, and a specified amount of disk storage. Within the cloud system, a resource manager may select a set of available physical resources from the cloud resource pool (e.g., servers, storage disks) and may provision and create a new virtual machine in accordance with the customer's specified computing parameters. Cloud computing services may service multiple customers with private and/or public components, and may be configured to provide various specific services, including web servers, security systems, development environments, user interfaces, and the like.

SUMMARY

In accordance with an example embodiment, a method may include running virtual sessions on a virtualization server for a plurality of client devices associated with respective users, with the virtual sessions being responsive to traffic from the client devices. The method may further include generating baseline traffic patterns for the users based upon the traffic from respective client devices during the virtual sessions, monitoring traffic during a new virtual session for a given client device and detecting an anomaly therein relative to at least one of the baseline traffic patterns, and generating an anomaly alert based upon detecting the anomaly.

More particularly, in an example embodiment the client devices may have keyboards associated therewith, and the method may further include generating the baseline traffic patterns based upon traffic from the keyboards to the client devices during the virtual sessions. Moreover, the baseline traffic patterns may be generated based upon a typing speed associated with the traffic from the keyboards during the virtual sessions. In accordance with another example, generating the baseline traffic patterns may include generating heat maps based upon the traffic from the client devices during the virtual sessions. Additionally, the client devices have input/output (I/O) ports associated therewith, and generating the baseline traffic patterns may accordingly include generating the baseline traffic patterns based upon traffic associated with the I/O ports, for example.

In accordance with one example embodiment, generating the baseline traffic patterns may include generating the baseline traffic patterns based upon machine learning, and the method may further include updating the baseline traffic patterns based upon false positive anomaly events. By way of example, detecting may include detecting the anomaly based upon a Gaussian distribution. Furthermore, the virtual sessions may comprise at least one of virtual desktop sessions and virtual application sessions. Additionally, the virtualization server may comprise an on-premises virtualization server or a cloud-based virtualization server.

A related virtualization server may include a memory and a processor cooperating therewith to run virtual sessions on a virtualization server for a plurality of client devices associated with respective users, with the virtual sessions being responsive to traffic from the client devices. The processor may further generate baseline traffic patterns for the users based upon the traffic from respective client devices during the virtual sessions, monitor traffic during a new virtual session for a given client device and detect an anomaly therein relative to at least one of the baseline traffic patterns, and generate an anomaly alert based upon detecting the anomaly A related non-transitory computer-readable medium may have computer-executable instructions for causing a processor of a virtualization server to perform steps including running virtual sessions on the virtualization server for a plurality of client devices associated with respective users, with the virtual sessions being responsive to traffic from the client devices. The steps may further include generating baseline traffic patterns for the users based upon the traffic from respective client devices during the virtual sessions, monitoring traffic during a new virtual session for a given client device and detecting an anomaly therein relative to at least one of the baseline traffic patterns, and generating an anomaly alert based upon detecting the anomaly.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

Figure 1:
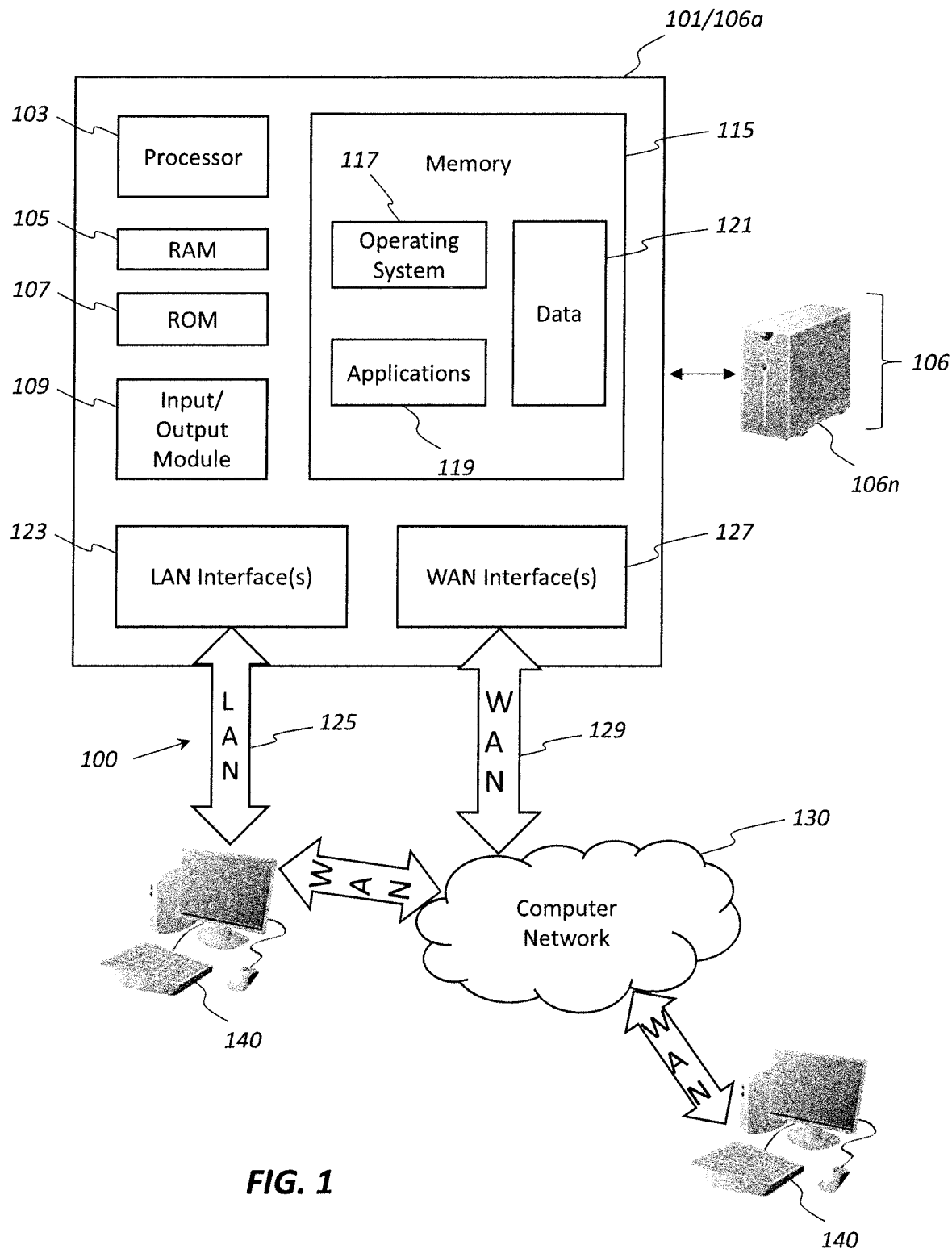
FIG. 1 is a schematic block diagram of an example operating environment in which various aspects of the disclosure may be implemented.

FIG. 1 illustrates an example block diagram of a generic computing device, which in the illustrated example is a computer server 106a, in an example computing environment 100. According to one or more aspects, the server 106a may be a single-server or multi-server desktop virtualization system (e.g., a cloud system) configured to provide virtual machines for client access devices. The server 106a illustratively includes a processor 103 for controlling overall operation of the server and its associated components, including random access memory (RAM) 105, read-only memory (ROM) 107, input/output (I/O) module 109, and memory 115.

I/O module 109 may include a mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling the server 106a to perform various functions. For example, memory 115 may store software used by the server 106a, such as an operating system 117, application programs 119, and an associated database 121. Alternatively, some or all of the computer executable instructions for the server 106a may be embodied in hardware or firmware (not shown).

The server 106a may operate in a networked environment supporting connections to one or more remote computers, such as terminals 140 (also referred to as client or user devices). The terminals 140 may be personal computers or servers that include many or all of the elements described above with respect to the server 106a. The network connections depicted in FIG. 1 include a local area network (LAN) 125 and a wide area network (WAN) 129, but may also include other networks. When used in a LAN networking environment, the server 106a may be connected to the LAN 125 through a network interface or adapter 123. When used in a WAN networking environment, the server 106a may include a modem 127 or other network interface for establishing communications over the WAN 129, such as computer network 130 (e.g., the Internet). It will be appreciated that the network connections shown are illustrative and other means of establishing a communications link between the computers may be used.

The generic computing device and/or terminals 140 may also be mobile terminals (e.g., mobile phones, smartphones, PDAs, notebooks, etc.) including various other components, such as a battery, speaker, and antennas (not shown) in some embodiments.

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

In embodiments utilizing XENAPP or XENDESKTOP from Applicant Citrix systems, CITRIX RECEIVER is client software that provides access to XENDESKTOP and XENAPP installations. To provide a centralized virtual computing experience that is similar to that of a local computer to end users, Citrix HDX Adaptive Transport provides an enhanced user experience, regardless of network conditions, LAN, or a high-latency WAN. A large portion of the functionality and communication between the XENAPP Plugin/Receiver and XENAPP Server is facilitated by HDX via virtual traffic channels. Such virtual traffic channels may be used for graphics, disks, COM ports, LPT ports, printers, audio, video, smart card or even third-party custom virtual traffic channels, for example. A virtual channel may include a client-side virtual driver that communicates with a server-side application. XENAPP not only provides for standardized virtual channels, but also allows for customers or third-party vendors to create their own virtual channels by using one of the provided Software Development Kits (SDKs). Virtual channels provide a secure way to accomplish a variety of tasks, for example, an application running on a XENAPP Server communicating with a client-side device or an application communicating with the client-side environment.

On the client side, virtual channels correspond to virtual drivers; each providing a specific function. Some are required for normal operation, and others are optional. Virtual drivers operate at the presentation layer protocol level. There may be a number of these protocols active at any given time by multiplexing channels that are provided by the WinStation protocol layer.

The following is a list of client virtual driver files for respective types of traffic are provided within the HDX framework, and their respective function as used by the XENAPP Plugins/Receiver for Windows which are in the form of Dynamic Link Libraries (user mode):

vd3dn.dll—Direct3D Virtual Channel used for Desktop Composition Redirection
vdcamN.dll—Bi-directional Audio
vdcdm30n.dll—Client Drive Mapping
vdcom30N.dll—Client COM Port Mapping
vdcpm30N.dll—Client Printer Mapping
vdct1n.dll—ICA Controls Channel
vddvc0n.dll—Dynamic virtual channel
vdeuemn.dll—End User Experience Monitoring
vdflash2.dll (vdflash.dll)—Flash virtual channel
vdgusbn.dll—Generic USB Virtual channel
vdkbhook.dll—Transparent Key Pass-Through
vdlfpn.dll—Framehawk Display channel over UDP like transport
vdmmn.dll—Multimedia Support
vdmrvc.dll—Mobile Receiver Virtual channel
vdmtchn.dll—Multi-Touch support
vdscardn.dll—Smartcard support
vdsens.dll—Sensors virtual channel
vdspl30n.dll—Client UPD
vdsspin.dll—Kerberos
vdtuin.dll—Transparent UI
vdtw30n.dll—Client ThinWire
vdtwin.dll—Seamless
vdtwn.dll—Twain However, it should be noted that different types of traffic and/or channels may be used in various configurations, and that systems other than XENAPP/XENDESKTOP may be used as well.

As shown in FIG. 1, one or more client devices 140 may be in communication with one or more servers 106a-106n (generally referred to herein as "server(s) 106"). In one embodiment, the computing environment 100 can include an appliance installed between the server(s) 106 and client machine(s) 140. This appliance can manage client/server connections, and in some cases can load balance client connections amongst a plurality of backend servers 106.

The client machine(s) 140 can in some embodiments be referred to as a single client machine 140 or a single group of client machines 140, while server(s) 106 may be referred to as a single server 106 or a single group of servers 106. In one embodiment, a single client machine 140 communicates with more than one server 106, while in another embodiment a single server 106 communicates with more than one client machine 140. In yet another embodiment, a single client machine 140 communicates with a single server 106.

A client machine 140 can, in some embodiments, be referenced by any one of the following terms: client machine(s) 140; client(s); client computer(s); client device(s); client computing device(s); user device(s); local machine; remote machine; client node(s); endpoint(s); or endpoint node(s). The server 106, in some embodiments, may be referenced by any one of the following terms: server(s), local machine; remote machine; server farm(s), or host computing device(s).

In one embodiment, the client machine 140 may be a virtual machine. The virtual machine may be any virtual machine, while in some embodiments the virtual machine may be any virtual machine managed by a hypervisor developed by Citrix Systems, IBM, VMware, or any other hypervisor. In some aspects, the virtual machine may be managed by a hypervisor, while in aspects the virtual machine may be managed by a hypervisor executing on a server 106 or a hypervisor executing on a client 140.

The client machine 140 may execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

Still other embodiments include a client device 140 that displays application output generated by an application remotely executing on a server 106 or other remotely located machine. In these embodiments, the client device 140 may execute a client agent application to display the output in an application window, a browser, or other output window. In one example, the application is a desktop, while in other examples the application is an application that generates a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 106, in some embodiments, executes a remote presentation client or other client or program that uses a thin-client or remote-display protocol to capture display output generated by an application executing on a server 106 and transmits the application display output to a remote client 140. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment can include more than one server 106a-106n such that the servers 106a-106n are logically grouped together into a server farm 106, for example, in a cloud computing environment. The server farm 106 can include servers 106 that are geographically dispersed and logically grouped together in a server farm 106, or servers 106 that are located proximate to each other and logically grouped together in a server farm 106. Geographically dispersed servers 106a-106n within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments, the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS, manufactured by Microsoft Corp. of Redmond, Wash., UNIX, LINUX, or MAC OS). In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. Some embodiments include a first server 106 a that receives requests from a client machine 140, forwards the request to a second server 106n, and responds to the request generated by the client machine 140 with a response from the second server 106n. The first server 106a can acquire an enumeration of applications available to the client machine 140 as well as address information associated with an application server 106 hosting an application identified within the enumeration of applications. The first server 106a can then present a response to the client's request using a web interface, and communicate directly with the client 140 to provide the client 140 with access to an identified application.

Client machines 140 can, in some embodiments, be a client node that seeks access to resources provided by a server 106. In other embodiments, the server 106 may provide clients 140 or client nodes with access to hosted resources. The server 106. In some embodiments, functions as a master node such that it communicates with one or more clients 140 or servers 106. In some embodiments, the master node can identify and provide address information associated with a server 106 hosting a requested application, to one or more clients 140 or servers 106. In still other embodiments, the master node can be a server farm 106, a client 140, a cluster of client nodes 140, or an appliance.

One or more clients 140 and/or one or more servers 106 can transmit data over a network 130 installed between machines and appliances within the computing environment 100. The network 130 can comprise one or more sub-networks, and can be installed between any combination of the clients 140, servers 106, computing machines and appliances included within the computing environment 100. In some embodiments, the network 130 can be: a local-area network (LAN); a metropolitan area network (MAN); a wide area network (WAN); a primary network 104 comprised of multiple sub-networks located between the client machines 140 and the servers 106; a primary public network 130 (e.g., the Internet) with a private sub-network; a primary private network 130 with a public sub-network; or a primary private network 130 with a private sub-network. Still further embodiments may include a network 130 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network that includes a wireless link where the wireless link can be an infrared channel or satellite band. The network topology of the network 130 can differ within different embodiments, possible network topologies include but are not limited to: a bus network topology; a star network topology; a ring network topology; a repeater-based network topology; or a tiered-star network topology. Additional embodiments may include a network of mobile telephone networks that use a protocol to communicate among mobile devices, where the protocol may include, but is not limited to: AMPS; TDMA; CDMA; GSM; GPRS UMTS; or any other protocol able to transmit data among mobile devices.

FIG. 1 shows a high-level architecture of an illustrative desktop virtualization system. As shown, the desktop virtualization system may be a single-server, multi-server system, or cloud system, including at least one virtualization server 106 configured to provide virtual desktops and/or virtual applications to one or more client access devices 140. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 2:
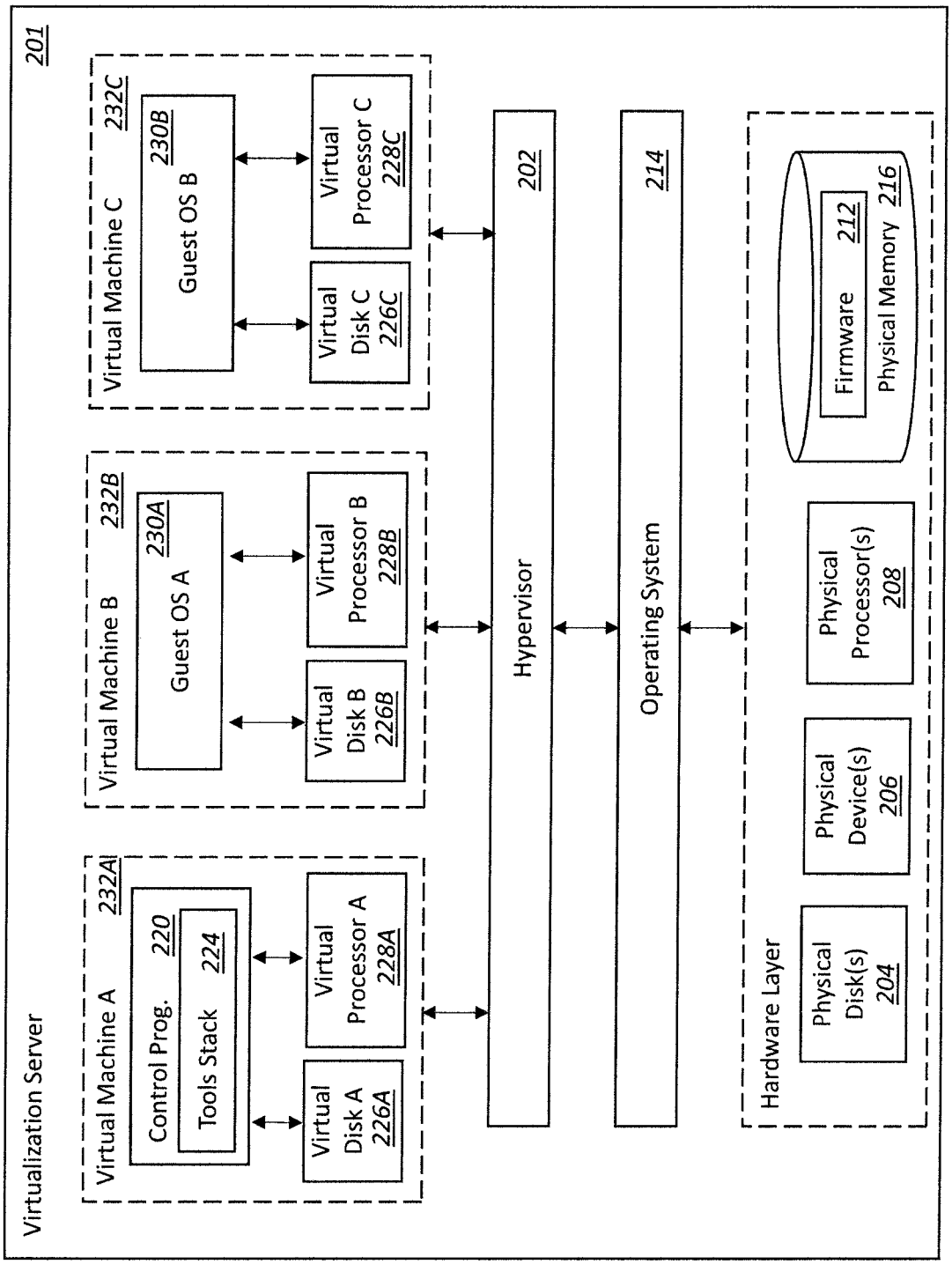
FIG. 2 is a schematic block diagram of an example virtualization server in accordance with one or more illustrative aspects described herein.

Illustrated in FIG. 2 is one embodiment of a computer device 201 configured as a virtualization server in a virtualization environment, for example, a single-server, multi-server, or cloud computing environment. The virtualization server 201 illustrated in FIG. 2 can be deployed as and/or implemented by one or more embodiments of the server 106 illustrated in FIG. 1 or by other known computing devices. Included in virtualization server 201 is a hardware layer that can include one or more physical disks 204, one or more physical devices 206, one or more physical processors 208 and a physical memory 216. In some embodiments, firmware 212 can be stored within a memory element in the physical memory 216 and can be executed by one or more of the physical processors 208. The virtualization server 201 may further include an operating system 214 that may be stored in a memory element in the physical memory 216 and executed by one or more of the physical processors 208. Still further, a hypervisor 402 may be stored in a memory element in the physical memory 216 and can be executed by one or more of the physical processors 208. Executing on one or more of the physical processors 208 may be one or more virtual machines 232A-C (generally 232). Each virtual machine 232 may have a virtual disk 226A-C and a virtual processor 228A-C. In some embodiments, a first virtual machine 232A may execute, on a virtual processor 228A, a control program 220 that includes a tools stack 224. In other embodiments, one or more virtual machines 232B-C may be executed, on a virtual processor 228B-C, a guest operating system 230A-B.

Furthermore the virtualization server 201 may include a hardware layer 210 with one or more pieces of hardware that communicate with the virtualization server 201. In some embodiments, the hardware layer 210 can include one or more physical disks 204, one or more physical devices 206, one or more physical processors 208, and one or more memory 216. Physical components 204, 206, 208, and 216 may include, for example, any of the components described above with respect to FIG. 1. For instance, physical disks 204 may include permanent memory storage, temporary memory storage, disk drives (e.g., optical, floppy, tape), hard disks, external hard drives, flash memory, network-attached storage, a storage-area network, or any other storage repository that the virtualization server 201 can access. Physical devices 206 may include any device included in the virtualization server 201 and/or any combination of devices included in the virtualization server 201 and external devices that communicate with the virtualization server 201. A physical device 206 may be, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with the virtualization server 201. The physical memory 216 in the hardware layer 210 may include any type of memory. The physical memory 216 may store data, and in some embodiments may store one or more programs, or set of executable instructions. FIG. 2 illustrates an embodiment where firmware 212 is stored within the physical memory 216 of the virtualization server 201. Programs or executable instructions stored in the physical memory 216 can be executed by the one or more processors 208 of the virtualization server 201.

Virtualization server 201 may also include a hypervisor 202. In some embodiments, hypervisor 202 may be a program executed by processors 208 on the virtualization server 201 to create and manage any number of virtual machines 232. The hypervisor 202 can be referred to as a virtual machine monitor, or platform virtualization software. In some embodiments, a hypervisor 202 can be any combination of executable instructions and hardware that monitors virtual machines executing on a computing machine. Hypervisor 202 may be a Type 2 hypervisor, or a hypervisor that executes within an operating system 214 executing on the virtualization server 201. A Type 2 hypervisor, in some embodiments, executes within an operating system 214 environment and virtual machines execute at a level above the hypervisor. In many embodiments, the Type 2 hypervisor executes within the context of a user's operating system such that the Type 2 hypervisor interacts with the user's operating system. In other embodiments, one or more virtualization servers 201 in a virtualization environment may include a Type 1 hypervisor (Not Shown). A Type 1 hypervisor may execute on the virtualization server 201 by directly accessing the hardware and resources within the hardware layer 210. That is, while a Type 2 hypervisor 202 accesses system resources through a host operating system 214, a Type 1 hypervisor may directly access all system resources without needing a host operating system 214. A Type 1 hypervisor may execute directly on one or more physical processors 208 of the virtualization server 201, and may include program data stored in the physical memory 216.

The hypervisor 202, in some embodiments, can provide virtual resources to operating systems 230 or control programs 220 executing on virtual machines 232 in any manner that simulates the operating systems 230 or control programs 220 having direct access to system resources. System resources can include: physical devices 206; physical disks; physical processors; physical memory 216 and any other component included in the virtualization server 201 hardware layer 210. In these embodiments, the hypervisor 202 may be used to emulate virtual hardware, partition physical hardware, virtualize physical hardware, or execute virtual machines that provide access to computing environments. In still other embodiments, the hypervisor 202 controls processor scheduling and memory partitioning for a virtual machine 232 executing on the virtualization server 201. Hypervisor 202 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a virtualization server 201 executes a hypervisor 202 that creates a virtual machine platform on which guest operating systems may execute. In these embodiments, the virtualization server 201 can be referred to as a host server. An example of such a virtualization server is XEN SERVER provided by Citrix Systems. Virtual app and desktop sessions may further be provided by XENAPP AND XENDESKTOP, also from Citrix Systems. XENAPP is an application virtualization solution that enhances productivity with universal access to virtual apps, desktops, and data from any device. XENDESKTOP incorporates the same functionality as XenApp, plus the option to implement a scalable VDI solution.

The hypervisor 202 may create one or more virtual machines 232B-C (generally 232) in which guest operating systems 230 execute. In some embodiments, the hypervisor 202 may load a virtual machine image to create a virtual machine 232. In other embodiments, the hypervisor 202 may execute a guest operating system 230 within the virtual machine 232. In still other embodiments, the virtual machine 232 may execute the guest operating system 230.

In addition to creating virtual machines 232, the hypervisor 202 may control the execution of at least one virtual machine 232. In other embodiments, the hypervisor 202 may present at least one virtual machine 232 with an abstraction of at least one hardware resource provided by the virtualization server 201 (e.g., any hardware resource available within the hardware layer 210). In other embodiments, the hypervisor 202 may control the manner in which virtual machines 232 access the physical processors 208 available in the virtualization server 201. Controlling access to the physical processors 208 may include determining whether a virtual machine 232 should have access to a processor 208, and how physical processor capabilities are presented to the virtual machine 232.

As shown in the example of FIG. 2, the virtualization server 201 may host or execute one or more virtual machines 232. A virtual machine 232 is a set of executable instructions that, when executed by a processor 208, imitate the operation of a physical computer such that the virtual machine 232 can execute programs and processes much like a physical computing device. While FIG. 2 illustrates an embodiment where a virtualization server 201 hosts three virtual machines 232, in other embodiments, the virtualization server 201 can host any number of virtual machines 232. The hypervisor 202, in some embodiments, provides each virtual machine 232 with a unique virtual view of the physical hardware, memory, processor and other system resources available to that virtual machine 232. In some embodiments, the unique virtual view can be based on any of the following: virtual machine permissions; application of a policy engine to one or more virtual machine identifiers; the user accessing a virtual machine; the applications executing on a virtual machine; networks accessed by a virtual machine; or any other similar criteria. For instance, the hypervisor 202 may create one or more unsecure virtual machines 232 and one or more secure virtual machines 232. Unsecure virtual machines 232 may be prevented from accessing resources, hardware, memory locations, and programs that secure virtual machines 232 may be permitted to access. In other embodiments, the hypervisor 202 may provide each virtual machine 232 with a substantially similar virtual view of the physical hardware, memory, processor and other system resources available to the virtual machines 232.

Each virtual machine 232 may include a virtual disk 226A-C (generally 226) and a virtual processor 228A-C (generally 228.) The virtual disk 226, in some embodiments, is a virtualized view of one or more physical disks 204 of the virtualization server 201, or a portion of one or more physical disks 204 of the virtualization server 201. The virtualized view of the physical disks 204 can be generated, provided, and managed by the hypervisor 202. In some embodiments, the hypervisor 202 provides each virtual machine 232 with a unique view of the physical disks 204. Thus, in these embodiments, the virtual disk 226 included in each virtual machine 232 can be unique when compared with the other virtual disks 226.

A virtual processor 228 can be a virtualized view of one or more physical processors 208 of the virtualization server 201. In some embodiments, the virtualized view of the physical processors 208 can be generated, provided, and managed by the hypervisor 202. In some embodiments, the virtual processor 228 has substantially all of the same characteristics of at least one physical processor 208. In other embodiments, the virtual processor 208 provides a modified view of the physical processors 208 such that at least some of the characteristics of the virtual processor 228 are different than the characteristics of the corresponding physical processor 208.

Figure 3:
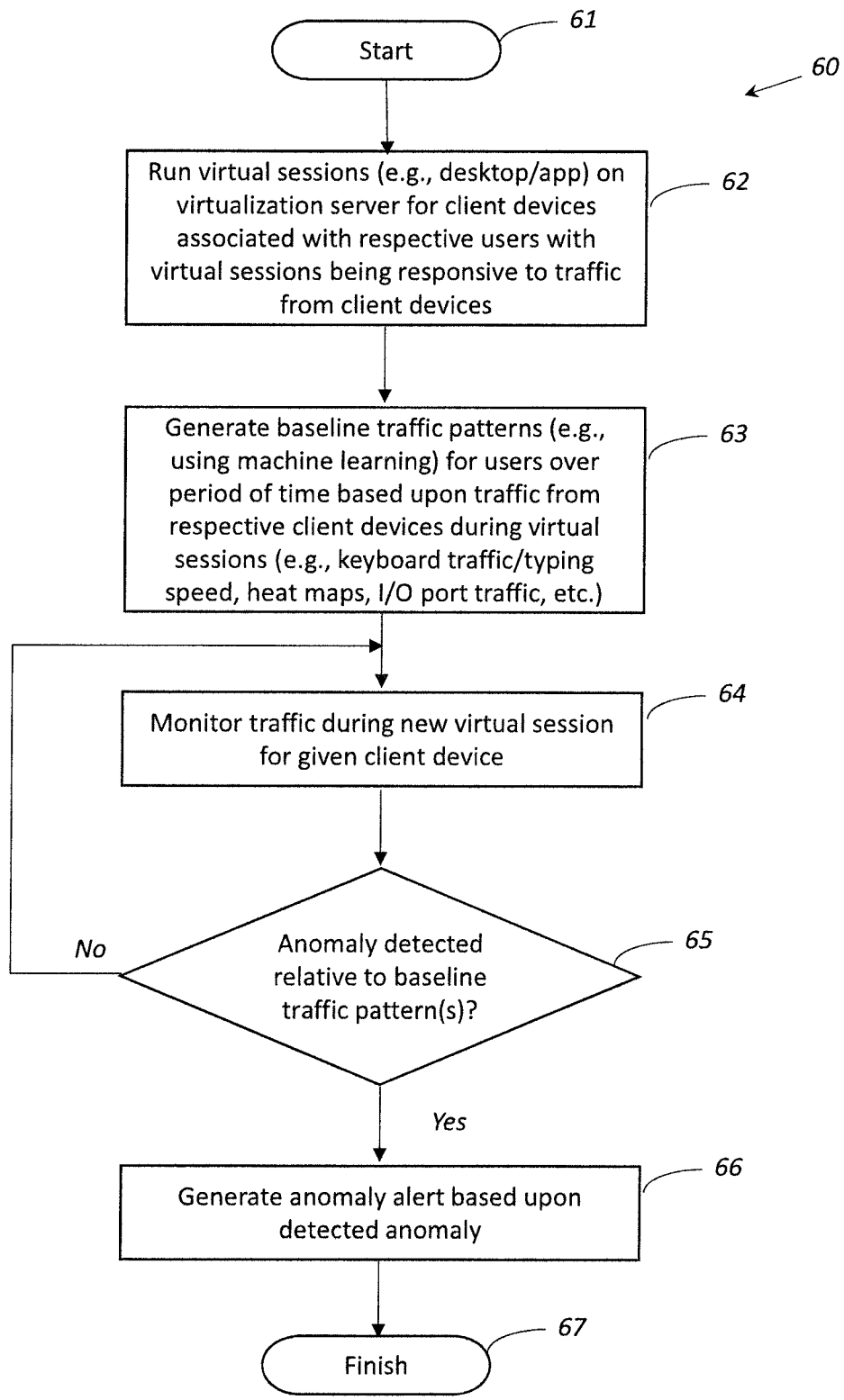
FIG. 3 is a flow diagram of a method for detecting anomalies in virtual machine sessions in accordance with an example embodiment.

Turning to the flow diagram 60 of FIG. 3, which begins at Block 61, a method for performing anomaly detection in virtual computing sessions, such as those provided by the virtualization server 201, is now described. For purposes of the following examples, it should be noted that virtualization server 201 may be implemented as an on-premises virtualization server or a cloud-based virtualization server. Moreover, while a single virtualization server 201 is shown in the illustrated example of FIG. 2, more than one such server may be used in some embodiments to provide a distributed virtualization environment, if desired.

As noted above, virtual sessions are run or hosted by the virtualization server 201 for different client devices 140, at Block 62, which are associated with respective users who each have their own unique user credentials. In some instances, a user may have a single designated client device 140 from which he or she accesses virtual sessions, or in other instances a user may be able to access virtual sessions from multiple different client devices by logging into the different devices with their unique user credentials.

One significant problem that should be addressed in computing environments, and particularly in virtual computing environments, is security. Attacks on a virtual computing system may come from many different sources. For example, external attacks may occur as a result of identity theft, hackers, or the like. Furthermore, internal attacks may occur from authorized users attempting to perform unauthorized actions. In this regard, the number of cases for fraudulent behavior by users from inside organizations is increasing. One approach to address this problem in a virtualized computing environment is to implement session recording, which allows IT administrators to review what users have done in previous virtual sessions. However, a problem with session recording is that its deterrence is only as effective as the number of recorded sessions IT administrators can inspect. For example, in a large corporate or government environment, there may be hundreds or even thousands of sessions daily, making it difficult if not impossible for IT administrators to analyze all of the session recordings.

As noted above, during a virtual session (e.g., a virtual desktop session or virtual application session), the virtualization server 201 operates the virtual sessions responsive to traffic from respective client devices 140, such as through the HDX channel framework described above. In accordance with an example embodiment, the virtualization server 201 may generate baseline traffic patterns for respective users over a period of time based upon the traffic from respective client devices during the virtual sessions, at Block 63. By way of example, the traffic used to generate the baseline traffic pattern may include one or more of the traffic types associated with the above-noted HDX traffic channels, such as keyboard traffic, print traffic, input/output (I/O) traffic (e.g., USB traffic), and mouse clicks.

By way of example, the virtualization server 201 (or another computer) may utilize machine learning to learn the way in which respective users normally interact with the hosted virtual app or desktop. In the present example, this is done based upon their interactions (i.e., traffic) which goes to the virtualization server 201 via HDX, although other traffic detection or monitoring approaches may also be used in different embodiments. For example, the machine learning process may span one or more prior virtual sessions, and may be updated on a rolling or continuous basis. Moreover, the baseline traffic patterns may also be updated based upon false positives, if desired.

Figure 4:
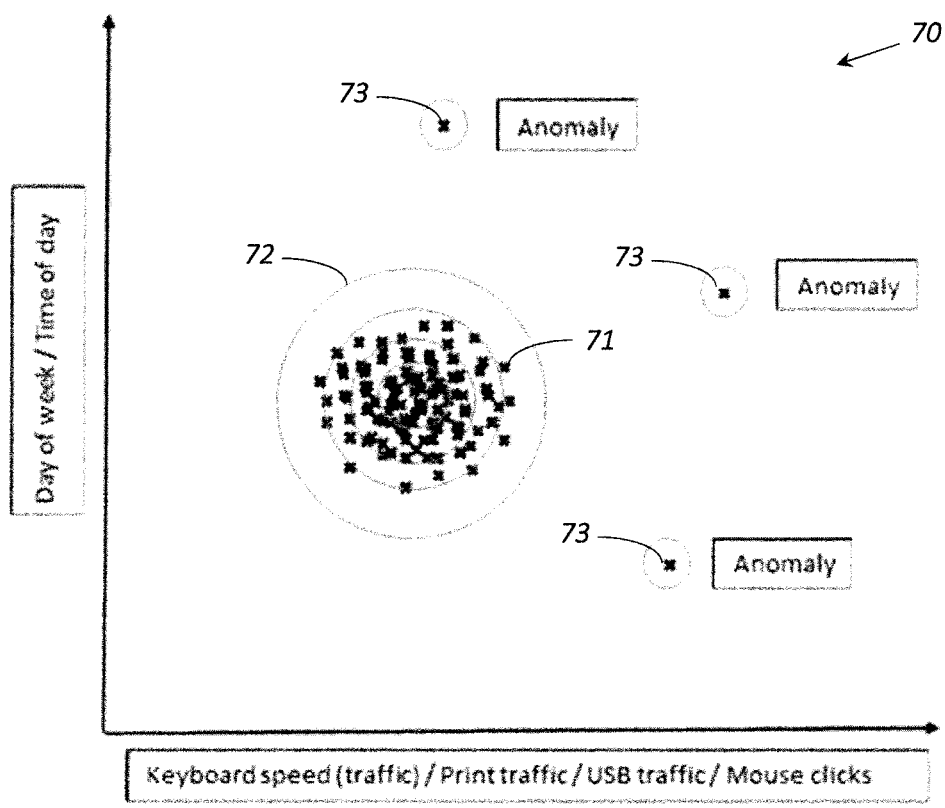
FIG. 4 is a graph illustrating baseline traffic patterns and anomalies in accordance with an example embodiment.

One example baseline traffic profile is shown in the graph 70 of FIG. 4 which plots days of the week/time of day vs. a combination of keyboard traffic (speed), print traffic, USB traffic, and mouse traffic (clicks). The baseline traffic profile is indicated by a circle 72 in which a plurality of normal usage points 71 (i.e., X marks) are located for respective users. In this regard, the baseline traffic profile accordingly corresponds to or is defined by the activities of a plurality of different users.

By monitoring new virtual sessions (Block 64) and comparing them to the normal baseline traffic profile across the entire user base (Block 65), when an individual user in a new virtual session causes a traffic pattern resulting in a point 73 outside of the circle 72, these are determined to be outliers or anomalies that result in an anomaly alert being generated, at Block 66, which illustratively concludes the method of FIG. 3 (Block 67). By way of example, the alerts may be generated and sent to IT administrators, who may review and take corrective action in real time (or near real time) in some embodiments, or in other embodiments watch a session replay of the virtual session associated with the anomaly in question so that any problems may be addressed accordingly. That is, when any abnormal behavior is detected, e.g., as a result of clicking on places that the user never did in the past (potentially indicating deliberate fraudulent behavior), or different keyboard dynamics (potentially indicating identity theft), it may be flagged so that an administrator may perform further analysis by looking at the recorded session, or even a live session in some instances.

Figure 5:
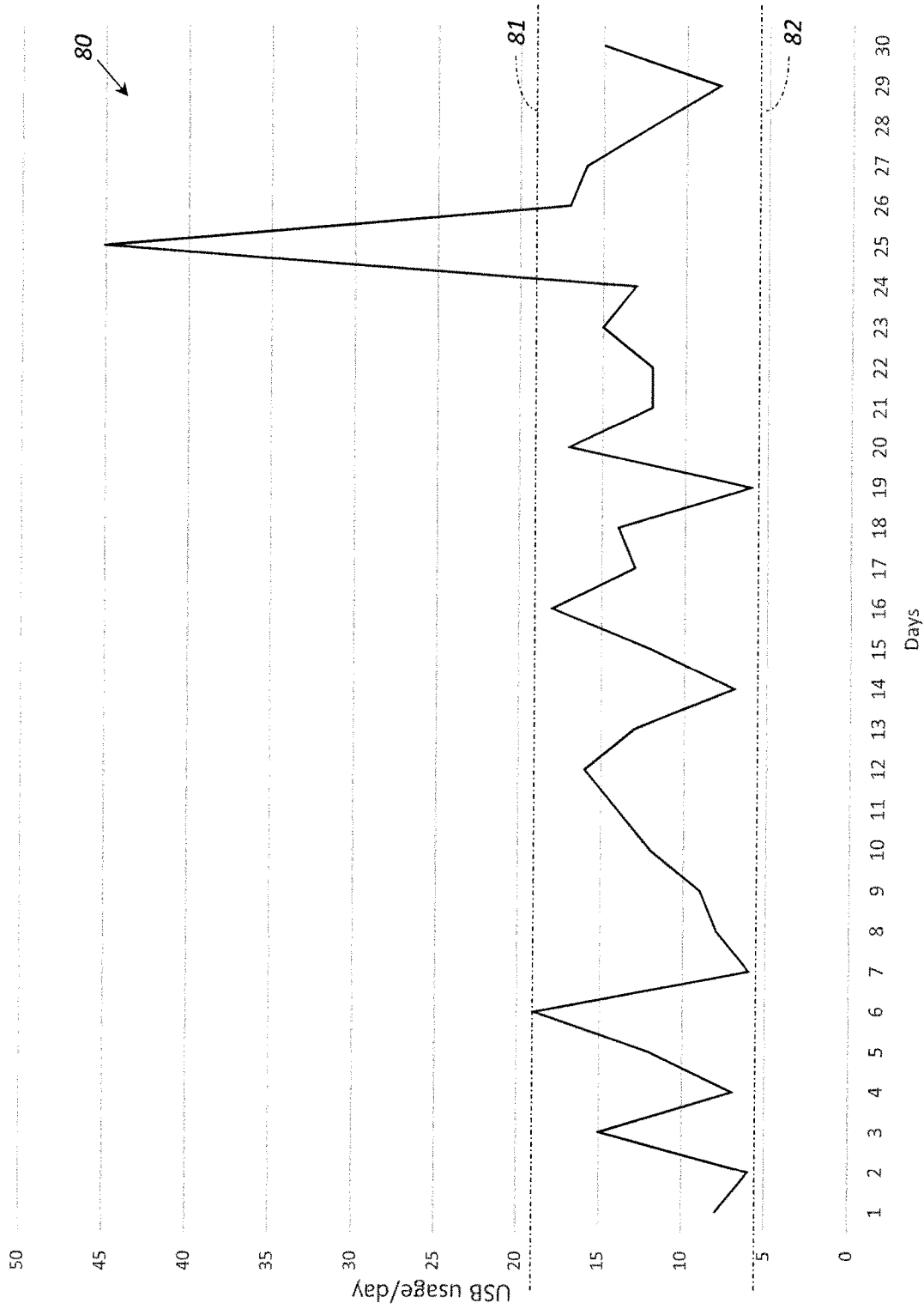
FIG. 5 is a graph of USB traffic frequency vs. time for a single user traffic pattern with an anomaly in accordance with an example embodiment.

In the graph 80 of FIG. 5, a graph of a single user's USB usage over a period of thirty days is shown. It may be seen that USB usage for this user has a normal baseline in a range of about five to twenty times per day, as indicated by the upper and lower dashed lines 81, 82. However, on day 25, the USB usage spikes above the normal level to 45 uses, indicating that something abnormal (i.e., an anomaly) occurred on this day. As a result, an anomaly alert may be generated accordingly so that an IT administrator may check to make sure that this was not the result of a hacker, etc., or unauthorized copying by the user, for example. In this example, the anomaly alert occurs as a result of a single type of traffic (i.e., USB) exceeding the normal baseline usage level, but as noted above the baseline traffic pattern (and anomaly) may include multiple different types of traffic.

In accordance with one example implementation, the baseline usage pattern and monitoring may be performed as follows. A heat map of user click behavior may be created for the hosted app or desktop. Again, with respect to a XENAPP or XENDESKTOP implementation, this may be determined via the HDX traffic channels. Moreover, user keystroke dynamics may also be learned as they are sent to the virtualization server 201 over a period of time through one or more sessions. Furthermore, user interaction patterns may be learned for a period of time (e.g., heat map (clicks) and typing speed), as well as profile "typical/normal" usage of traffic channels for the user and for the published application. The foregoing parameters may then be fed into an anomaly detection algorithm, such as a multi-variant Gaussian distribution anomaly detection algorithm. As a result, abnormalities such as the following may be flagged for review: the same user using the same app in the past, but anomalous interaction behavior at any given point; and the same app being used by different users for the same role, but with some user's interaction being anomalous. An anomaly alert may be sent out accordingly, and an administrator may then examine the anomaly to take corrective action in the case that it is a problem. Otherwise, if the anomaly is a false positive, this information may be provided as feedback to the machine learning to provide enhanced accuracy going forward.

It should be noted that other anomaly detection algorithms or approaches may be used in different embodiments. By way of example, these may include a single-variant Gaussian distribution, Principal Component Analysis (PCA) based anomaly detection, and a one-class support vector machine. In some embodiments, this may be done by simple baselining of average values. Other suitable approaches may also be used in different embodiments as well.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A method comprising:
    running virtual sessions on a virtualization server corresponding to a published application for a plurality of client devices associated with respective users, the client devices having user input devices associated therewith, and the virtual sessions being responsive to user input device traffic from a plurality of different virtual drivers at the client devices over a plurality of respective virtual channels;
    generating a heat map of user input device behavior including printing traffic and universal serial bus (USB) traffic based upon the traffic from the virtual drivers of respective client devices during the virtual sessions across the plurality of virtual channels;
    determining baseline user input traffic patterns for printing traffic and USB traffic for the users at the virtualization server based upon the heat map, and a normal usage pattern for the published application, the USB traffic relating to file copying;
    monitoring traffic over the virtual channels at the virtualization server during a new virtual session for a given client device and detecting an anomaly therein relative to the baseline user input traffic patterns for different users and the normal usage pattern for the published application based upon a multi-variant Gaussian distribution; and
    generating an anomaly alert based upon detecting the anomaly.

2. The method of claim 1 wherein the user input devices comprise keyboards; and wherein determining the baseline user input traffic patterns comprises determining the baseline user input traffic patterns based upon traffic from the keyboards to the client devices during the virtual sessions.

3. The method of claim 2 wherein determining the baseline user input traffic patterns further comprises determining the baseline user input traffic patterns based upon a typing speed associated with the traffic from the keyboards during the virtual sessions.

4. The method of claim 1 wherein determining the baseline user input traffic patterns comprises determining the baseline user input traffic patterns based upon machine learning.

5. The method of claim 1 wherein the virtual sessions comprise at least one of virtual desktop sessions and virtual application sessions.

6. The method of claim 1 wherein the user input devices comprise a respective mouse associated with each client device; and wherein generating the heat map comprises generating the heat map based upon user mouse click behavior.

7. A virtualization server comprising:
    a memory and a processor configured to cooperate with the memory to
        run virtual sessions on a virtualization server corresponding to a published application for a plurality of client devices associated with respective users, the client devices having user input devices associated therewith, and the virtual sessions being responsive to user input device traffic from a plurality of different virtual drivers at the client devices over a plurality of respective virtual channels;
        generate a heat map of user input device behavior including printing traffic and universal serial bus (USB) traffic based upon the traffic from the virtual drivers of respective client devices during the virtual sessions across the plurality of virtual channels,
        determine baseline user input traffic patterns for printing traffic and USB traffic for the users based upon the heat map, and a normal usage pattern for the published application, the USB traffic relating to file copying;
        monitor traffic over the virtual channels during a new virtual session for a given client device and detect an anomaly therein relative to the baseline user input traffic patterns for different users and the normal usage pattern for the published application based upon a multi-variant Gaussian distribution; and generate an anomaly alert based upon detecting the anomaly.

8. The virtualization server of claim 7 wherein the user input devices comprise keyboards; and wherein the processor determines the baseline user input traffic patterns based upon traffic from the keyboards to the client devices during the virtual sessions.

9. The virtualization server of claim 8 wherein the processor determines the baseline user input traffic patterns based upon a typing speed associated with the traffic from the keyboards during the virtual sessions.

10. The virtualization server of claim 7 wherein the user input devices comprise a respective mouse associated with each client device; and wherein the processor generates the heat map based upon user mouse click behavior.

11. A non-transitory computer-readable medium having computer-executable instructions for causing a processor of a virtualization server to perform steps comprising:
   running virtual sessions on the virtualization server corresponding to a published application for a plurality of client devices associated with respective users, the client devices having user input devices associated therewith, and the virtual sessions being responsive to user input device traffic from a plurality of different virtual drivers at the client devices over a plurality of respective virtual channels;
   generating a heat map of user input device behavior including printing traffic and universal serial bus (USB) traffic based upon the traffic from the virtual drivers of respective client devices during the virtual sessions across the plurality of virtual channels;
   determining baseline user input traffic patterns for printing traffic and USB traffic for the users over a period of time based upon the heat map, and a normal usage pattern for the published application, the USB traffic relating to file copying;
   monitoring traffic over the virtual channels during a new virtual session for a given client device and detecting an anomaly therein relative to the user input baseline traffic patterns for different users and the normal usage pattern for the published application based upon a multi-variant Gaussian distribution; and
   generating an anomaly alert based upon detecting the anomaly.

12. The non-transitory computer-readable medium of claim 11 wherein the user input devices comprise keyboards; and wherein determining the baseline user input traffic patterns comprises determining the baseline user input traffic patterns based upon traffic from the keyboards to the client devices during the virtual sessions.

13. The non-transitory computer-readable medium of claim 12 wherein determining the baseline user input traffic patterns further comprises determining the baseline user input traffic patterns based upon a typing speed associated with the traffic from the keyboards during the virtual sessions.

14. The non-transitory computer-readable medium of claim 11 wherein the user input devices comprise a respective mouse associated with each client device; and wherein generating the heat map comprises generating the heat map based upon user mouse click behavior.

* * * * *